US012763515B2

(12) United States Patent
Panitz et al.

(10) Patent No.: US 12,763,515 B2
(45) Date of Patent: Oct. 13, 2026

(54) HIGH-VOLTAGE CONNECTOR HAVING HIGH-VOLTAGE TAB CONTACT WITH TOUCH PROTECTION

(71) Applicants: TE Connectivity Solutions GmbH, Schaffhausen (CH); Tyco Electronics France SAS, Pontoise (FR)

(72) Inventors: Gregor Panitz, Bensheim (DE); Dirk Duenkel, Bensheim (DE); Joachim Uhrle, Woert (DE); Jochen Brandt, Woert (DE); Pierre Leprivey, Pontoise (FR); Xavier Rouillard, Pontoise (FR); Imad Smirani, Pontoise (FR); Alexis Mettavant, Pontoise (FR); Jingwen Yang, Pontoise (FR)

(73) Assignee: TE CONNECTIVITY SOLUTIONS GMBH, Schaffhausen (CH)

(*) Notice: Subject to any disclaimer, the term of this patent is extended or adjusted under 35 U.S.C. 154(b) by 293 days.

(21) Appl. No.: 18/412,877

(22) Filed: Jan. 15, 2024

(65) Prior Publication Data

US 2024/0243517 A1 Jul. 18, 2024

(30) Foreign Application Priority Data

Jan. 17, 2023 (DE) ......................... 102023100974.5

(51) Int. Cl.
*H01R 13/53* (2006.01)
*H01R 43/20* (2006.01)

(52) U.S. Cl.
CPC ............. *H01R 13/53* (2013.01); *H01R 43/20* (2013.01); *H01R 2201/26* (2013.01)

(58) Field of Classification Search
CPC ................................ H01R 13/44; H01R 13/53
(Continued)

(56) References Cited

U.S. PATENT DOCUMENTS 6,039,613 A * 3/2000 Bullard ................ H01R 9/2416 439/718
8,951,051 B2 * 2/2015 Natter .................... H01R 13/04 439/135
(Continued)

FOREIGN PATENT DOCUMENTS

CN 113196578 A 7/2021
DE 112019003253 T5 5/2021
(Continued)

OTHER PUBLICATIONS

Search Report for corresponding EP Application No. 24151779.6 dated Apr. 10, 2024 (28 pages).
(Continued)

*Primary Examiner* — Hae Moon Hyeon
(74) *Attorney, Agent, or Firm* — Jay J. Hoette; Carroll, Hoette & Butscher, LLC

(57) ABSTRACT

An electrical high-voltage tab terminal for a high-voltage connector, preferably for a vehicle, in particular a vehicle with an electric traction motor, includes an electrical high-voltage tab contact extending in the longitudinal direction and an electrically insulating touch protection portion provided on a free longitudinal end portion of the high-voltage tab contact, wherein the high-voltage tab contact has, in the free longitudinal end portion, at least one stud-like plug base arranged in the width direction of the high-voltage tab contact, and the touch protection portion has at least one plug socket which is at least partially complementary thereto, the at least one plug base being plugged together with the at least one plug socket.

24 Claims, 9 Drawing Sheets

(58) Field of Classification Search
USPC .............................. 439/733.1, 135, 149, 718
See application file for complete search history.

(56) References Cited

U.S. PATENT DOCUMENTS

| | | | |
|---|---|---|---|
| 10,855,018 B2 | 12/2020 | Duenkel et al. | |
| 11,955,746 B2 * | 4/2024 | Mastel | H01R 13/44 |
| 12,482,996 B2 * | 11/2025 | Porebski | H01R 13/6273 |
| 2001/0044239 A1 | 11/2001 | Gugliotti et al. | |
| 2020/0014140 A1 * | 1/2020 | Duenkel | H01R 13/44 |
| 2020/0107848 A1 | 4/2020 | Apperson et al. | |
| 2021/0257768 A1 * | 8/2021 | Shimizu | H01R 13/04 |
| 2022/0328996 A1 | 10/2022 | Mastel | |
| 2023/0128184 A1 * | 4/2023 | Kamemura | H01R 13/44 439/149 |

FOREIGN PATENT DOCUMENTS

| | | | |
|---|---|---|---|
| EP | 3026759 | A1 | 6/2016 |
| JP | 2011222361 | A | 11/2011 |
| JP | 2014179290 | A | 9/2014 |
| JP | 2020017522 | A | 1/2020 |
| JP | 2022161025 | A | 10/2022 |
| KR | 20200004761 | A | 1/2020 |

OTHER PUBLICATIONS

Office Action for corresponding JP Application No. 2024004956 dated Jan. 7, 2025 (21 pages).
Office Action for corresponding JP Application No. 2024004956 dated Jul. 9, 2025 (6 pages).
Search Report for corresponding DE Application No. 102023100974.5 dated Sep. 22, 2023 (11 pages).
Office Action for corresponding IN Application No. 202444003039, dated Mar. 26, 2026, (7 pages).
Office Action for corresponding KR Application No. 1020240007256 dated Jun. 19, 2026, (11 pages).

* cited by examiner

HIGH-VOLTAGE CONNECTOR HAVING HIGH-VOLTAGE TAB CONTACT WITH TOUCH PROTECTION

CROSS REFERENCE TO RELATED APPLICATIONS

This application claims the benefit of DE Application No. 102023100974.5 filed 17 Jan. 2023, and EP Application No. 24151779.6, filed 15 Jan. 2024, the subject matter of which are herein incorporated by reference in their entirety.

BACKGROUND OF THE INVENTION

The subject matter herein relates to terminals for a high-voltage connector.

In the electrical area (electrics, electrical technology, electrical engineering, etc.), apart from ground-based electrical engineering and analogues thereof, a large number of electrical connectors are known. These are used, for example, to connect electrical voltages in the high-voltage range (high voltages: alternating voltages over 30V and up to over 1 kV, direct voltages over 60V and up to over 1.5 kV) and/or electric currents in the high-current range (high currents over 25 A and up to over 1 kA). The connectors ensure faultless transmission for the supply and/or distribution of electrical energy in warm, possibly hot, dirty, damp and/or chemically aggressive environments in the short term and/or permanently.

Because of a wide range of applications, a large number of such connectors are known in the automotive sector and nonautomotive sector apart from ground-based electrical engineering and analogues thereof. In the automotive sector, such a high-voltage and/or high-current connector is suitable, for example, for connecting electrical high-voltage and/or high-current lines, electrically connecting such a line to a corresponding electrical high-voltage entity, and vice versa, or for another type of electromechanical contacting. In this specification, it is intended that the term high-voltage also comprises the term high-current.

The high-voltage connector can be used for a direct or an indirect high-voltage and/or high-current connection for an electrical high-voltage and/or high-current source. Such a high voltage and/or such a high current comes from an electrical high-voltage entity or is determined for a high-voltage entity. Such a high-voltage entity is, for example, a rechargeable battery module or a rechargeable battery, a traction battery module or a traction battery, an inverter, switchgear, an electric (traction) motor, an apparatus, an appliance, etc. (cf. also below).

High costs for fossil fuels and efforts to reduce environmental impacts make hybrid or electric vehicles necessary, for example in the automotive sector. One aspect of these vehicles is the handling of high electrical charging and operating voltages and high electrical charging and operating currents, wherein relevant components of the vehicles have to be designed accordingly. This is relevant, for example, for high-voltage and/or high-current lines (for example, stranded lines, busbars, etc. made from a copper alloy or preferably an aluminum alloy) and for the relevant high-voltage terminals (for example, connection pieces, flat contacts, busbars, etc. made from an aluminum alloy or preferably a copper alloy) of the high-voltage connectors.

Such a high-voltage connector and its housing can be provided at an electrical line, a cable, a cable harness, etc., referred to below as a (pre)assembled (electrical) cable, this also being referred to here as an electrical high-voltage entity. A high-voltage connector and its housing can moreover be provided at/in an electrical device or means, for example, at/in a housing, at/on a leadframe, at/on a busbar, etc.; a (power) electrical component or a corresponding aggregation etc. this likewise also being referred to here as an electrical high-voltage entity.

If a high-voltage connector is situated at a cable, this is also described as a flying (plug) connector or a plug, a socket or a coupling; if it is situated at/in an electrical component, aggregation, etc., this is also described as a connector device, for example, a (built-in/attached) connector, a (built-in/attached) plug or a (built-in/attached) socket. In electrical engineering (generating, converting, storing and transporting electrical heavy current in electrical networks preferably with three-phase current high-voltage transmission), they are described as cable fittings because of their complex construction.

In the high-voltage sector, there are very high requirements for the holding force of a touch protection means on a high-voltage contact means of a high-voltage terminal, in particular a high-voltage tab terminal. For this reason, a touch protection means is often injection-molded onto the high-voltage contact means in order to achieve the high holding force of the touch protection means on the high-voltage contact means and thus obtain a high-voltage terminal, in particular a high-voltage tab terminal, for a high-voltage connector.

Alternatively, in addition to a plug connection between the touch protection means and the high-voltage contact means, additional bonding or heat staking is used between the high-voltage contact means and the touch protection means. In a modern high-voltage terminal, in particular a high-voltage tab terminal, it is also undesirable or even impermissible for a touch protection means to extend onto a contact surface of the high-voltage contact means. In other words, the touch protection means must be limited to a free end of the high-voltage contact means.

There is a need for an improved electrical high-voltage terminal, including an improved high-voltage tab terminal, for a high-voltage connector. There is a need for an improved method for assembling an electrical high-voltage connector. There is a need for a touch protection means for a free end of the high-voltage contact means.

BRIEF DESCRIPTION OF THE INVENTION

In an embodiment, the subject matter herein is achieved by means of an electrical high-voltage tab terminal for a high-voltage connector, by a method for assembling an electrical high-voltage connector, by means of an electrical high-voltage connector for an electrical high-voltage connection, and by means of an electrical high-voltage entity. —Advantageous developments, additional features and/or advantages of the subject matter herein can be found in the dependent claims and the following description.

In an embodiment, a high-voltage tab terminal is provided including a high-voltage electrical tab contact means extending in the longitudinal direction and an electrically insulating touch protection means provided at a free longitudinal end portion of the high-voltage tab contact means, wherein the high-voltage tab contact means may have, in its free longitudinal end portion, at least one stud-like plug base arranged in the width direction of the high-voltage tab contact means, and the touch protection means may have at least one plug socket which is at least partially complementary thereto, the at least one plug base being plugged together with the at least one plug socket.

The high-voltage tab contact means may have, in its free longitudinal end portion, a plurality of stud-like plug bases arranged in the width direction of the high-voltage tab contact means, and the touch protection means has a plurality of plug sockets which are at least partially complementary to said plug bases, the plug bases being plugged together with the plug sockets (for example the shown first variant). In this case, the plug bases and, analogously, the plug sockets are provided, in particular, staggered substantially linearly in the width direction.

Here, the term 'high-voltage tab terminal' shall include the terms 'high-voltage tab terminal' and 'high-current tab terminal' and the touch protection means can, of course, also be referred to as a finger protection cap or similar. An analogy to a plug base and a plug socket should be a lamp base, e.g. an E27 base, and a lamp socket, e.g. an E27 socket, wherein here both latching partners are of course not screwed together, but the plug base is plugged into the plug socket or the plug socket is plugged onto the plug base, i.e. the plug bases and plug sockets are plugged together.

In various embodiments, the plurality of plug bases and the at least partially complementary plug sockets, i.e. a large number of possible attachment points between a high-voltage tab contact means and a touch protection means, result in a high holding force of the touch protection means on the high-voltage tab contact means, furthermore without any risk of deformation or even damage to the touch protection means. Assembly of the touch protection means, i.e. merely plug assembly, is significantly more cost-effective compared to the prior art (cf. above: injection molding process, additional bonding, heat staking).

In a transition area of the high-voltage tab terminal from the touch protection means to the high-voltage tab contact means, the touch protection means can be arranged substantially flush on at least one side, at least two sides, at least three sides or four sides with the longitudinal sides of the high-voltage tab contact means in the high-voltage tab terminal that adjoin it, i.e. that adjoin the touch protection means. Here, the flush arrangement of the touch protection means with the high-voltage tab contact means is naturally considered in the longitudinal direction, wherein a gap can be established between the touch protection means and the high-voltage tab contact means.

In various embodiments, the touch protection means is tapered in the direction of its free longitudinal end. In this case, it is preferable that the touch protection means is tapered in the direction of its free longitudinal end on at least two opposite longitudinal sides, but in particular on all four longitudinal sides. In the first case, the touch protection means has the shape of a gable (roof) cut off at the top or the shape of a four-sided regular prism and in the second case the shape of a hip (roof) cut off at the top or the shape of a four-sided prism.

The stud-like plug bases of the high-voltage tab contact means can be pin-like and/or cuboid. A pin-like plug base can have a, in principle, arbitrary, but preferably a substantially elliptical, circular, triangular, square, rectangular or even polygonal base area. A cuboid plug base naturally has a square or rectangular base area. Accordingly, one side (90° cover) of a latching base is straight, angular (external corner, internal corner), curved (convex, concave), partially elliptical, partially circular, etc.

At least/exactly two, at least/exactly three, at least/exactly four or at least/exactly five plug bases can be arranged in the free longitudinal end portion. A different number is of course possible. A clamping slot can be arranged between two directly adjacent plug bases to accommodate a clamping bar of the touch protection means. The clamping slot is preferably arranged as a through-slot between the two directly adjacent latching bases. The outer flanks of the outer plug bases in the width direction can preferably each have no clamping device and/or can taper towards each other conically in the direction of their free ends.

When the touch protection means is assembled on the high-voltage contact means, the clamping bar, which is made of plastic in particular, moves forward into the clamping slot, wherein the clamping slot pushes or presses on both sides of the clamping bar, thus cancelling out the forces that occur and preventing mechanical forces from acting outwards on the touch protection and causing it to bulge. Furthermore, a plug base preferably has no clamping device on its outer sides extending in the longitudinal direction and width direction. Furthermore, these outer sides can taper conically towards each other in the direction of their free ends. This means that the plug bases are substantially smooth on these outer sides, with the possible exception of a transition area to a beveled edge.

A single plug base can protrude from an end face of the high-voltage tab contact means and the end face can delimit the free longitudinal end portion inwards in/on the high-voltage tab contact means. The end face can thus also be designated as an inner end face of the high-voltage tab contact means. Furthermore, individual plug bases can be offset inwards (quasi radially) from the four longitudinal sides of the high-voltage tab contact means on at least one side, at least two sides, at least three sides or four sides. The high-voltage tab contact means naturally has two narrow longitudinal sides (extending in the thickness and longitudinal direction) and two large-area longitudinal sides (extending in the width and longitudinal direction). In addition, individual plug bases can be tapered conically on at least one side, at least two sides, at least three sides or four sides in the direction of their free end.

Furthermore, starting from the end face of the high-voltage tab contact means and in the direction of its free end, an individual plug base can initially have a substantially cylindrical portion (with an, in principle, arbitrary base area). Subsequently, an individual plug base preferably has substantially the shape of a truncated pyramid or a truncated cone, a gable (roof) cut off at the top or a four-sided regular prism, or a hip (roof) cut off at the top or a four-sided prism. This means that the free end of the plug base is preferably flush with a surface, in particular a square surface or a rectangular surface. Preferably, a plug base is made of a solid material, in particular a copper alloy or aluminum alloy, as is preferably also the substantially entire high-voltage tab contact means.

The plug sockets can be arranged in the touch protection means as chambers, preferably open on at least one side. The touch protection means can have fewer or exactly the same number of plug sockets as the high-voltage tab contact means has plug bases. A clamping bar can be arranged between two directly adjacent plug sockets for fastening the touch protection means in a clamping slot of the high-voltage tab contact means. The outer areas of the touch protection means in the width direction can only be designed as covers for an area of the high-voltage tab contact means located there. This means, for example, that within such an area of the touch protection means, the touch protection means merely rests against the high-voltage tab contact means or a plug base or is seated with a preload force.

The touch protection means can be pressed, latched and/or bonded with the high-voltage tab contact means. In addition or alternatively, the high-voltage tab terminal can be designed in such a way that the main retaining forces between the touch protection means and the high-voltage tab contact means only act in the width direction and/or substantially cancel each other out in the width direction. This naturally applies to a rest position of the high-voltage tab terminal. In this case, high holding forces can be achieved, which are caused by high pressing and/or latching forces of the high-voltage tab contact means on the touch protection means, without causing deformation or even damage to an outer side of the touch protection means.

A clamping bar of the touch protection means can be fixed in a corresponding clamping slot of the high-voltage tab contact means. In this case, at least one, at least two, at least three or a plurality of clamping bars and clamping slots corresponding to one another can be arranged in the high-voltage tab terminal. The clamping bar can be held in the clamping slot in a force-fit and/or form-fit manner. The clamping bar can be pressed into the clamping slot and/or latched in the clamping slot. In the first case, the clamping bar is designed as a press-fit bar (elastically and/or plastically deformable) and the clamping slot as a press-fit slot, and in the second case, the clamping bar is designed as a latching bar and the clamping slot as a latching slot. Furthermore, the clamping bar can be fixed in the clamping slot by two opposing retaining forces acting substantially in the width direction.

In the case of a press fit (e.g. wedge connection, clamp connection, etc.) between a clamping slot and a clamping bar, the clamping bar can be elastically and/or plastically deformed by an assembly energy and the clamping slot. In this case, the press fit can also be supplemented by a form fit and/or a bonding of the plug base to the plug socket. In the case of a latching connection (e.g. clamping connection, clipping, wedge connection, etc.) between a clamping slot and a clamping bar, at least partially complementary latching devices (corresponding latching elements, latching protrusion and latching recess, etc.) of the clamping slot and the clamping bar can cooperate. In this case, the latching can also be supplemented by a press fit and/or a bonding of the plug base to the plug socket.

Alternatively or additionally, the plug bases can be received in the plug sockets primarily or substantially in a force-fit, form-fit and/or integrally bonded manner. In the case of bonding between a plug base and a plug socket, no elastic (as in the case of a press fit or possibly a latching connection) and/or no plastic (as substantially in the case of a press fit) deformation of the plug sockets is required; however, this can of course be used. In this case, the bonding can also be formed by a press fit and/or a latching of the plug base with the plug socket or a clamping slot and a clamping bar.

A plug base can have at least one clamping device, in particular in the form of a pressing device or a latching device. In this case, the clamping device can be mechanically effective only at/in the clamping slot. Furthermore, the clamping device can be designed as a pressing projection or a latching projection or a latching recess. In the event that the clamping device is mechanically effective only at/in the clamping slot, the clamping device preferably projects exclusively into the clamping slot. The clamping device can be located on an inner longitudinal side and preferably not on an outer longitudinal side of the plug base.

The outer edge areas of the outward-facing inner end face of the high-voltage tab contact means and of the inward-facing outer end face of the touch protection means, which are opposite each other and in particular completely encircle (radially) the longitudinal direction, can be arranged mainly or substantially congruent, substantially parallel, substantially form-fittingly against each other and/or directly adjacently to each other in the high-voltage tab terminal via a narrow slot. In this case, both the outward-facing (normal vector) inner end face of the high-voltage tab contact means and the inward-facing (normal vector) outer end face of the touch protection means are each preferably formed radially on the outside to be substantially rectangular around the longitudinal direction.

In embodiments, the high-voltage tab terminal can be designed as a straight or angled high-voltage tab terminal. The high-voltage tab contact means can be symmetrical at least in its free longitudinal end portion. In this case, the longitudinal end portion can be designed with mirror symmetry or 180° rotational symmetry with respect to the longitudinal direction. Furthermore, in embodiments, a single high-voltage tab terminal can be designed as a single two-piece, firmly closed component. In addition, the high-voltage tab terminal can be obtained by a method for assembling a high-voltage electrical connector.

Furthermore, the stud-like plug base of the high-voltage tab contact means may be shaped as a fastening rail running in width direction, and the touch protection means may be shaped as a slide which is slipped in width direction onto the fastening rail with its plug socket designed as a slotted plug socket (for example the shown second variant). The above mentioned features of the high-voltage tab terminal may of course be applicable here.

The fastening rail can be formed from a plurality of lugs or tabs, as a continuous projection, etc. The fastening rail and the slotted plug socket may comprise interacting assembly fixtures, so that the touch protection means may be fixed in longitudinal direction and in width direction at the high-voltage tab contact means. I.e. the fastening rail is accommodated in the slotted plug socket, wherein the fastening rail keeps the touch protection means on the high-voltage tab contact means. For this purpose, the fastening rail may have external assembly fixtures and the slotted plug socket may have internal assembly fixtures.

The slotted plug socket and the fastening rail may be formed in such a way that in width direction, the touch protection means can be attached laterally to the fastening rail and be pushed laterally over the fastening rail, whereby the fastening rail is received in the slotted plug socket. When the touch protection means is initially pushed over the fastening rail, the slotted plug socket, which may be open on at least one lateral side, may be pressed more open and thus the fastening rail can be received in the slotted plug socket. After an assembly of the touch protection means at the fastening rail, the fastening rail may be, in particular, essentially only form-fittingly received in the touch protection means.

By means of assembly fixtures of the slotted plug socket and the fastening rail, the touch protection means may be held essentially force-free by means of a positive fit on the high-voltage tab contact means, for which purpose assembly fixtures are seated against one another. I.e. there is no mechanical interference and no mechanical stress in an assembled state of the touch protection means at the high-voltage tab contact means. The touch protection means may sit in a relaxed state, i.e., without mechanical tensioning or pre-tensioning, at the high-voltage tab contact means.

Assembly fixtures of the fastening rail may comprise an upper assembly fixture extending in width direction and a lower assembly fixture extending in width direction. The upper assembly fixture and the lower assembly fixture may be arranged one behind the other in longitudinal direction, whereby these form an undercut outside at the fastening rail. By means of such an undercut and, for example, the end face of the high-voltage tab contact means, the touch protection means can be fixed to the high-voltage tab contact means in longitudinal direction.

Preferably two such undercuts may be provided in the fastening rail in thickness direction, wherein inner sides of the slotted plug socket abut with positive fits against these undercuts. An upper assembly fixture may be constituted as a protrusion and a lower assembly fixture may be constituted as a recess in the fastening rail.

Further, a portion in width direction of the radially upper outward-facing of the high-voltage contact means, an upper protrusion of the fastening rail as well as relevant portions of both lateral outer shoulders (see below) may constitute a frame for the lower assembly recess. Two such frames are preferably used, whereby the two frames are arranged one behind the other in thickness direction. Here, the two frames share the both lateral outer shoulders. Within such a frame, an inner protrusion of the slotted plug socket is hold essentially without force.

Further, assembly fixtures of the slotted plug socket may comprise an upper assembly fixture extending in width direction and a lower assembly fixture extending in width direction. The upper assembly fixture and the lower assembly fixture may be arranged one behind the other in longitudinal direction, whereby these form an undercut inside in the slotted plug socket.

In various embodiments, two such undercuts may be provided in the slotted plug socket in thickness direction, wherein outer sides of the fastening rail abut with positive fits against these undercuts. Here, an upper assembly fixture may be constituted as an assembly recess and a lower assembly fixture may be constituted as a protrusion in the slotted plug socket. Mutual undercuts of the fastening rail and the slotted plug socket are designed as a positive and a negative or vice versa, and/or are complementary to each other at least in portions.

In width direction, a lateral assembly fixture of the high-voltage tab contact means may be constituted as a lateral outer shoulder of the fastening rail, inwardly stepped at an end face of the high-voltage tab contact means. Further, in width direction, a lateral assembly fixture of the touch protection means is constituted as a lateral inner shoulder of the slotted plug socket, wherein the lateral inner shoulder delimits the actual plug socket.

By means of the lateral outer assembly fixtures of the high-voltage tab contact means and the lateral inner assembly fixtures of the touch protection means, the touch protection means can be fixed to the high-voltage tab contact means in width direction. After the assembly of the touch protection means at the fastening rail, the two lateral outer shoulders of the fastening rail abut against the two lateral inner shoulders of the slotted plug socket.

In order to receive the fastening rail, the slotted plug socket may be open preferably only on one lateral side. Of course, the slotted plug socket may also be open on both lateral sides. Here, a lateral opening of the slotted plug socket for receiving the fastening rail in the slotted plug socket may comprise an insertion slope. And the lateral opening may comprise two tapered wedges which guide the fastening rail into the actual slotted plug socket during assembly of the touch protection means at the high-voltage tab contact means. The two tapered wedges may of course be set up one behind the other in thickness direction in the slotted plug socket.

Corresponding to the insertion slope of the lateral opening of the slotted plug socket, a relevant shoulder of the fastening rail can of course also have at least one insertion slope, in particular two insertion slopes arranged one behind the other in thickness direction. A shoulder surface of the fastening rail opposite this shoulder preferably has no insertion slope, but is designed as a flat surface, in particular as a rectangular section of a plane. —In the assembled state of the touch protection means at the high-voltage tab contact means, a preferably flat inner surface of a tapered wedge of the insertion slope of the touch protection means sits on this flat shoulder surface.

In various embodiments, a method of assembling a high voltage electrical connector includes at least one high-voltage contact means is plugged from one side into an electrically insulating connector housing, which is open there, and centers in the connector housing at the same time or in a temporal sequence, wherein, when the high-voltage contact means is moved forward into its final assembly position in the connector housing, a touch protection means installed in the connector housing is plug-assembled on a free longitudinal end portion of the high-voltage contact means.

The high-voltage terminal can be designed here as a high-voltage tab terminal, a high-voltage pin terminal or a high-voltage socket terminal. Furthermore, the touch protection means is of course not only fixedly connected to the connector housing in the preassembly position, but in particular already temporally after the connector housing, i.e. an actual connector housing including the touch protection means, has been produced.

When the high-voltage contact means is moved forward to its final assembly position in the connector housing, the touch protection means can be plugged onto the high-voltage contact means and/or plugged into the high-voltage contact means. In the first case, the free longitudinal end portion of the high-voltage contact means penetrates into the touch protection means, and, in the second case, the touch protection means penetrates into the high-voltage contact means with a free longitudinal end portion.

Furthermore, when the high-voltage contact means is moved forward, the plug assembly of the touch protection means on the high-voltage contact means can be supported by a tool for counter-holding. In this case, the counter-holding tool naturally acts against the direction of plugging or advance of the high-voltage contact means into the connector housing. In addition, the high-voltage contact means can be fixed, in particular locked, in the connector housing when the high-voltage contact means is moved forward for the final assembly position. At least one locking mechanism of the high-voltage contact means in the connector housing is used for this purpose. In addition to such a primary locking mechanism, a secondary locking mechanism can be used.

When the touch protection means arranged in the connector housing is plug-assembled, a press-fit connection, a latching connection and/or an adhesive-bonding connection can be established between the touch protection means and the high-voltage contact means. Furthermore, the touch protection means arranged in the connector housing can be detached from a connection to the connector housing. In this case, the connection of the touch protection means to the connector housing can be a mechanical and/or adhesive connection. In addition, the touch protection means can be entrained into the connector housing by a forward movement of the high-voltage contact means. This means that the touch protection means loses its mechanical connection to the connector housing substantially fully in favor of a fixed mechanical connection to the high-voltage contact means.

In the final assembly position of the high-voltage contact means in the connector housing, a high-voltage terminal, comprising the high-voltage contact means and the touch protection means, is obtained in the high-voltage connector. In other words, during the assembly of the high-voltage contact means in the connector housing, a high-voltage terminal in the connector housing is obtained from a single high-voltage contact means and a single touch protection means in the connector housing through their preferably mechanical connection.

The connection of the touch protection means to the connector housing can be designed as at least one integral or nonintegral connection between the touch protection means and the connector housing. Here, the integral connection can be formed as a comparatively thin layer of material (similar to a living hinge) or as a bar between the touch protection means and the connector housing. The material layer or the bar have the function of a predetermined breaking point. Furthermore, an integral bar to be cut away can be used for the connection. In these cases, the touch protection means can, in particular, be made of the same material as the connector housing (single-component injection molding process with separable cast components).

In addition, the connection of the touch protection means to the connector housing can be designed as an adhesive and/or form-fit connection between the touch protection means and the connector housing. Such a connection can be achieved, for example, using a multicomponent injection molding process with separable cast components. The two cast components can sit adhesively on each other here and/or one cast component is partially form-fittingly provided (latching connection or similar) on/in the other cast component, e.g. by means of back molding and/or injection molding.

The touch protection means can be detached from the connector housing by moving the high-voltage contact means forward in the direction of its final assembly position. Furthermore, the touch protection means can be detached from the connector housing using a tool, in particular a cutting tool. The high-voltage contact means can be symmetrical at least in its free longitudinal end portion. Here, the longitudinal end portion can be mirror-symmetrical, rotationally symmetrical, or radially symmetrical with respect to the longitudinal direction, in particular with 180°, 120°, 90°, 72° or 60° rotational symmetry. The high-voltage terminal can be designed as a high-voltage tab terminal.

In various embodiments, a high-voltage connector includes an electrically insulating connector housing and at least one high-voltage terminal accommodated therein, wherein the high-voltage terminal is designed as a high-voltage tab terminal and/or the high-voltage terminal is assembled in the connector housing by an assembly method.

The high-voltage connector can be designed for electrical voltages of at least approximately: 100V, 200V, 300V, 400V, 500V, 600V, 750V, 1 kV, 1.25 kV, 1.5 kV, 1.75 kV or 2 kV. The high-voltage connector can here moreover be designed in such a way that it can in each case withstand short-term electrical voltages which are considerably above these values (for example, dynamic drive mode by approximately: +175%, +200%, +250%, +300%, +350%, +400%, +500%). The high-voltage connector can be designed for permanent electrical currents of at least approximately: 100 A, 200 A, 300 A, 400 A, 500 A, 750 A, 1 kA or 1.25 kA. The high-voltage connector can here moreover be designed in such a way that it can in each case withstand short-term electrical currents which are considerably above these values (for example, dynamic drive mode by approximately: +175%, +200%, +250%, +300%, +350%, +400%, +500%). These specifications naturally also apply to the high-voltage tab terminal or the high-voltage terminal.

The high-voltage connector, for example according to LV 214 or an analogue, can fulfil the vibration requirements of class or according to severity level: 2, 3 and/or 4. In particular, the vibration requirement of class or according to severity level 3 is met by means of the high-voltage connector. It is also possible that the high-voltage connector, e.g. according to LV 214 or an analogue, does not fulfil the vibration requirements of class or according to severity level: 4 and/or higher. —The high-voltage connector is preferably designed for a usage temperature of approximately 40° C. to approximately: 80° C., 100°, 120° C., 140° C., 150° C., 160° C., 170° C. or 180° C. These specifications naturally also apply to the high-voltage terminal or the high-voltage tab terminal and the connector housing.

In various embodiments, a high voltage entity includes an electrical device and a high-voltage tab terminal and/or a high-voltage connector. —Such a high-voltage entity can be formed, for example, as an electrical device, an assembled electrical cable, an electrical subassembly, an electrical busbar, an electrical module (rechargeable battery module, traction battery module), an electrical component (rechargeable battery, traction battery, inverter), an electrical appliance, an electrical apparatus, a switchgear, an electric (traction) motor, an electrical unit, an electrical installation, an electrical system, etc.

In various embodiments, a vehicle in particular a motor vehicle (road vehicle) but also: a rail vehicle, a water vehicle and/or an aircraft with an electric traction motor is understood to mean a motor vehicle which, in addition to an electric traction motor, can have a further nonelectric drive such as, for example, an internal combustion engine. This means that a vehicle with an electric traction motor can be understood to mean, for example, a hybrid electric vehicle, an electric vehicle (only an electromotive drive), a fuel cell vehicle, etc.

The subject matter herein is explained in detail below on the basis of exemplary embodiments with reference to the attached schematic drawing which are not to scale. Sections, elements, parts, units, components and/or diagrams which have an identical, unequivocal or analogous form and/or function are designated by the same reference signs in the description of the drawing (see below), the list of reference signs, the claims and in the Figures in the drawing. A possible alternative which is not explained in the description of the invention (see above), is not illustrated in the drawing and/or is non-exhaustive, a static and/or kinematic reversal, a combination, etc. of the exemplary embodiments of the invention or of a component, a diagram, a unit, a part, an element or a section thereof, can moreover be found in the list of reference signs and/or the description of the drawing.

In the invention, a feature (section, element, part, unit, component, function, size, etc.) can take a positive form, i.e. be present, or take a negative form, i.e. be absent. In this specification (description (description of the invention (see above), description of the drawing (see below)), list of reference signs, claims, drawing), a negative feature is not explicitly explained as a feature when according to the invention no importance is placed on whether it is absent. This means that the actual invention, and not an invention constructed according to the prior art, consists in omitting this feature.

A feature of this specification can be applied not only in a stated manner but also in a different manner (isolated, combined, replaced, added, made standalone, omitted, etc.). In particular, it is possible to replace, add or omit a feature in the claims and/or the description with the aid of a reference sign and a feature assigned thereto, and vice versa, in the description, the list of reference signs, the claims and/or the drawing. Furthermore, a feature can consequently be explained and/or specified in detail in a claim.

The features of the description can (given the (initially mostly unknown) prior art) also be interpreted as optional features; i.e. each feature can be considered as an optional, arbitrary or preferred, i.e. nonbinding, feature. It is thus possible to extract a feature, possibly including its periphery, from an exemplary embodiment, wherein this feature can then be transferred to a generalized inventive concept. The lack of a feature (negative feature) in an exemplary embodiment shows that the feature may be optional (known to a person skilled in the art) with regard to the invention. Moreover, a term of art for a feature can also be interpreted as a generic term for the feature (possible further hierarchical subdivision into subgenus, etc.), as a result of which it is possible to generalize the feature considering its same effect and/or equivalence.

BRIEF DESCRIPTION OF THE DRAWINGS

FIG. 16, final assembly position), an embodiment of a second variant of a high-voltage tab terminal, in each case at its free longitudinal end portion.

DETAILED DESCRIPTION OF THE INVENTION

Figure 2:
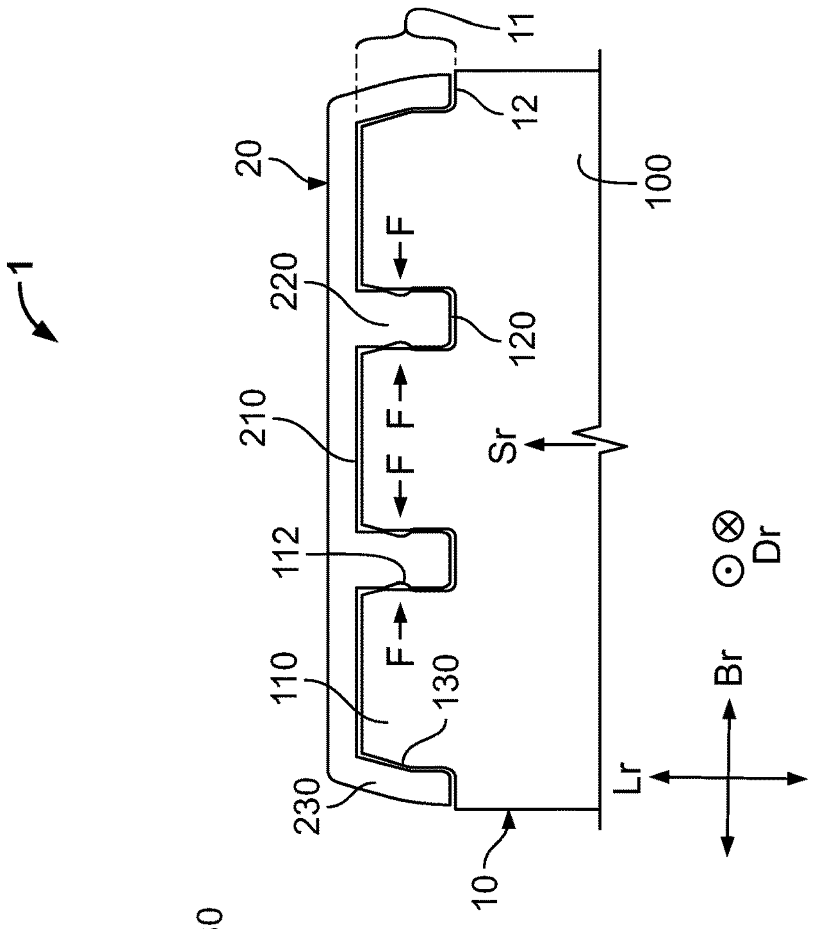
FIGS. 1 and 2 show, in a perspective view (FIG. 1, preassembly position) and in a centrally cut longitudinal side view in the width direction (FIG. 2, final assembly position), an embodiment of a high-voltage tab terminal, in each case at its free longitudinal end portion.

The invention is explained in more detail below with reference to exemplary embodiments of two variants (variant one: best seen in FIGS. 1 to 6, variant two: FIGS. 15 to 20) of an electrical high-voltage terminal 1 (also referred to as high-voltage terminal 1 and/or high-current terminal 1) as a high-voltage tab terminal 1 for a high-voltage connector 0 (also referred to as high-voltage connector 0 and/or high-current connector 0) for a vehicle, in particular a vehicle with an electric traction motor. Furthermore, the invention is explained in more detail below with reference to exemplary embodiments of a method for assembling an electrical high-voltage connector 0 (FIGS. 7 to 14), also for a vehicle. —The high-voltage connector 0 can be formed, for example, as a plug connector 0, an attached connector, a built-in connector 0, etc.

Although the invention is described and illustrated in more detail by preferred exemplary embodiments, the invention is not limited by the disclosed exemplary embodiments and instead is of a more fundamental nature. Other variants can be derived therefrom and/or from the above (description of the invention) without going beyond the scope of protection of the invention. The invention can generally be applied in the electrical sector, i.e. also in the nonautomotive sector, in the case of an electrical high-voltage (cf. above). Ground-based electrical engineering and analogues thereof form an exception. Only those physical portions of a subject of the invention are illustrated in the drawing which are necessary for understanding the invention. Terms such as connector and mating connector, terminal (cf. above) and mating terminal, et are to be interpreted synonymously, i.e. may in each case be interchangeable.

The explanation of the invention with reference to the drawing refers below to a longitudinal direction Lr (a selection of which is a plug(in) direction Sr of the high-voltage tab contact means 10 into the connector housing 5, cf. below), a width direction Br and a thickness direction Dr of the high-voltage tab terminal 1. The longitudinal direction Lr corresponds here to the main direction of extent of the high-voltage tab terminal 1 at least at its free longitudinal end portion 11. The electrical contact surfaces of the high-voltage tab terminal 1 extend in the width direction Br and longitudinal direction Lr, and the narrow side surfaces of the high-voltage tab terminal 1 extend in the thickness direction Dr (thickness, e.g. of a metal sheet from which the high-voltage tab terminal 1 is punched out) and longitudinal direction Lr.

Figure 1:
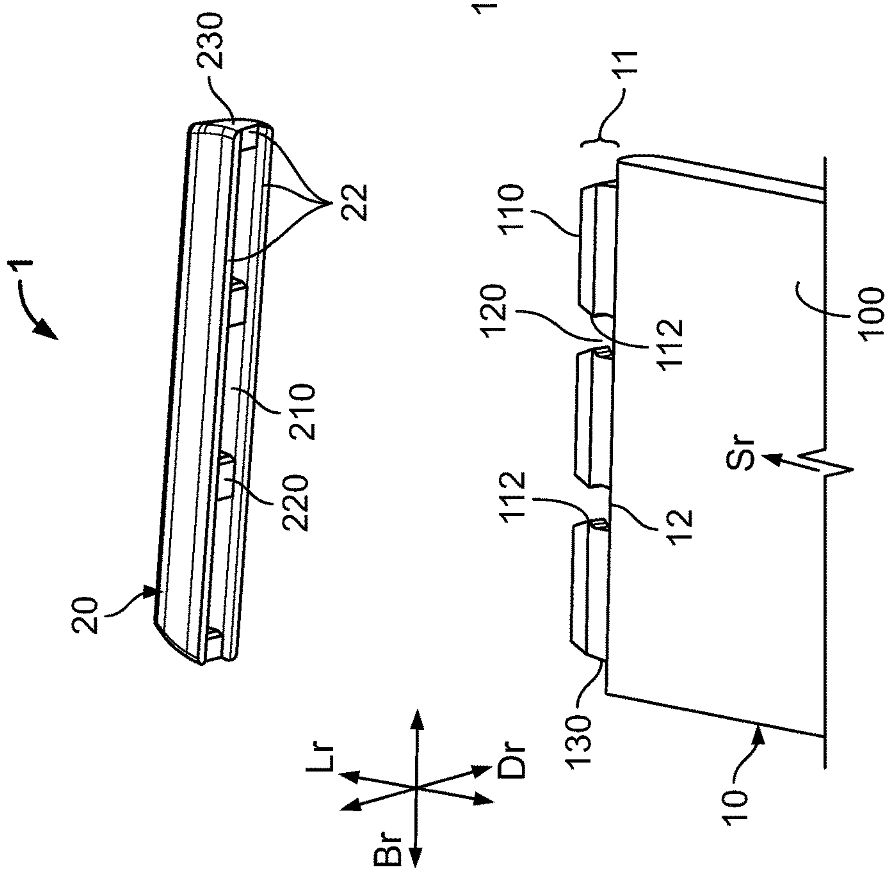
Figure 3:
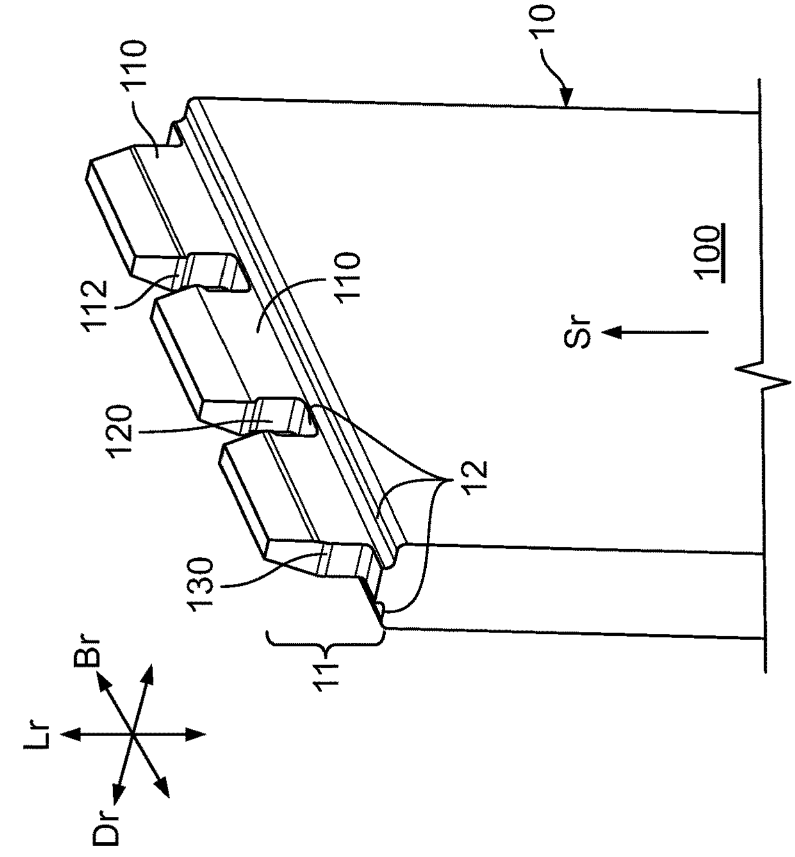
FIGS. 3 and 4 show, in a perspective view (FIG. 3) and in a longitudinal side view in the thickness direction (FIG. 4), a high-voltage tab contact means of the high-voltage tab terminal from FIGS. 1 and 2, in each case at its free longitudinal end portion.
Figure 4:
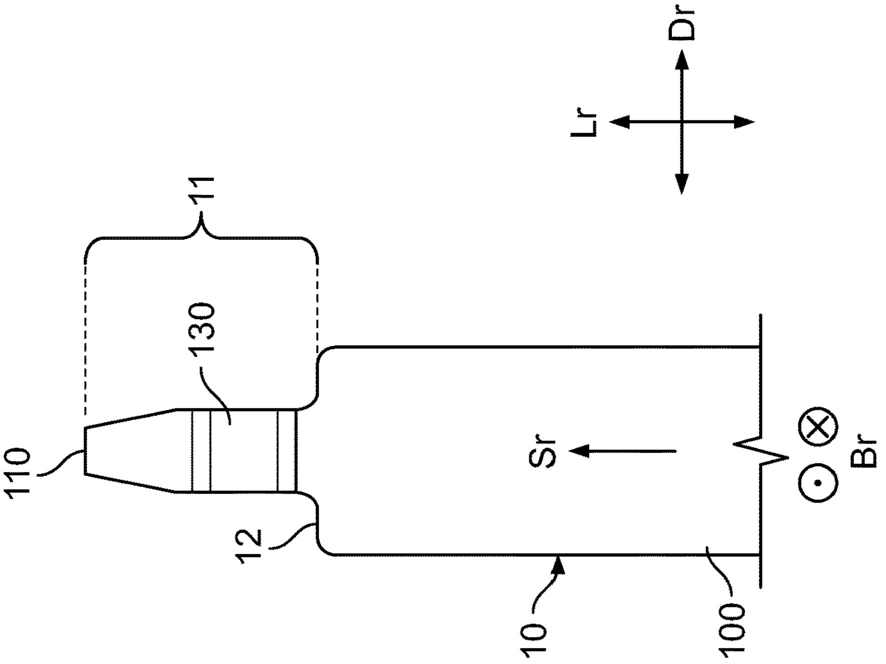
Figure 5:
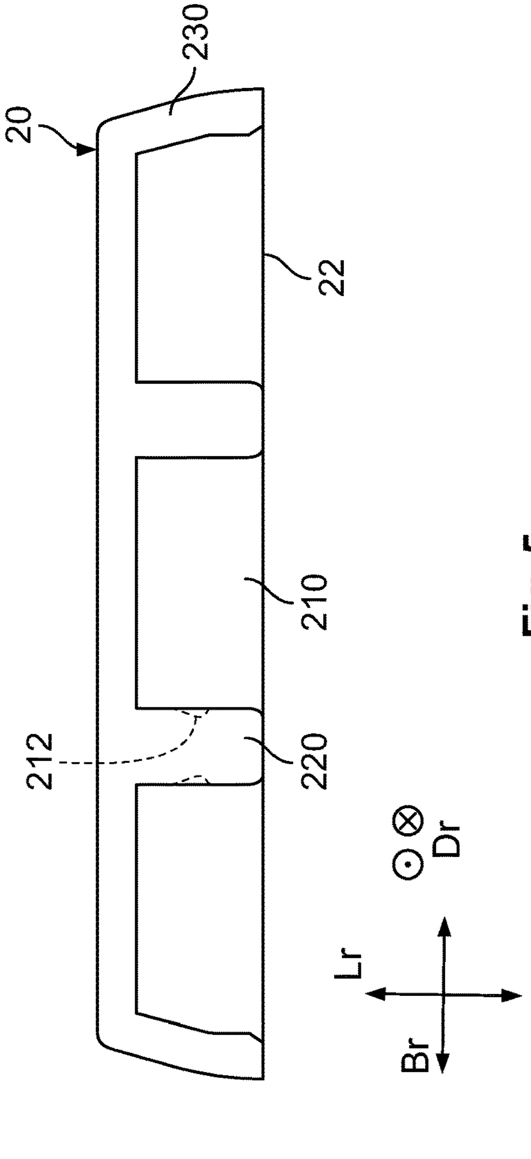
FIGS. 5 and 6 show, in a centrally cut longitudinal side view in the width direction (FIG. 5) and in a perspective view (FIG. 6), a touch protection means for the high-voltage tab contact means from FIGS. 3 and 4, FIGS. 7 to 9 show a single assembly step of a method for assembling a high-voltage electrical connector for a vehicle on the basis of the example of a high-voltage connector comprising a connector housing and a high-voltage tab contact means.
Figure 6:
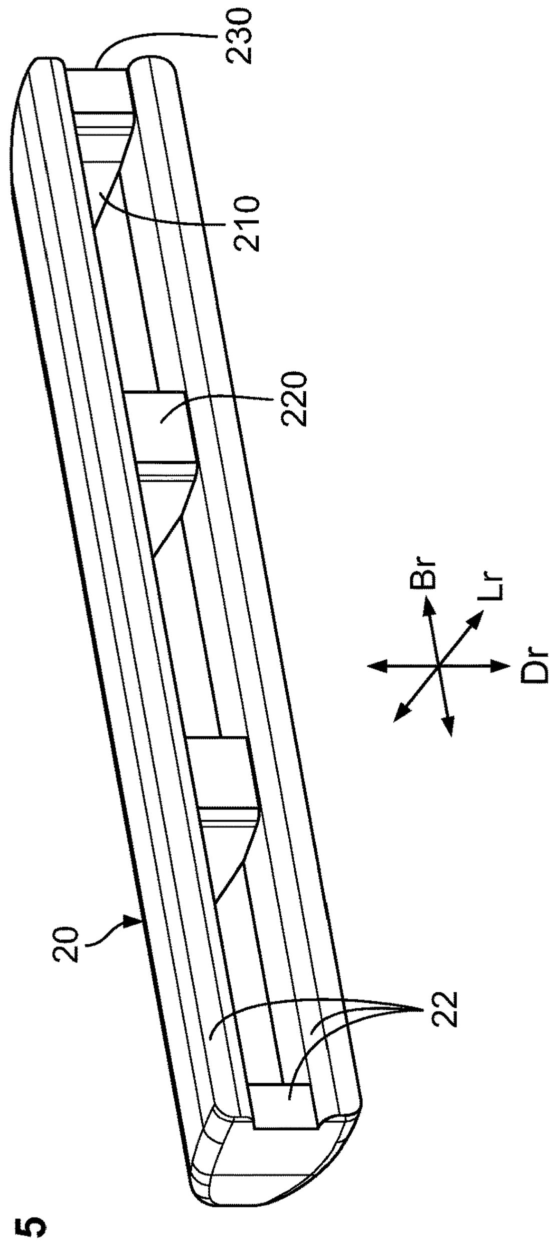

FIG. 1 shows an exploded perspective view and FIG. 2 shows a sectional plan view of the high-voltage (tab) terminal 1 comprising an electrical high-voltage contact means 10 (also referred to as high-voltage contact means 10 and/or high-current contact means 10) as a high-voltage tab contact means 10 and an electrically insulating touch protection means 20 which can be provided (FIG. 1) or is provided (FIG. 2) at/on the free longitudinal end portion 11 of said contact means. Here, the touch protection means 20 is can be connectable or connected to the high-voltage tab contact means 10 in a force-fit, form-fit and/or adhesive manner.

The straight or angled high-voltage tab contact means 10 (cf. also FIGS. 3 and 4) has a contact body 100 as a tab contact body 100, preferably with a mainly or substantially rectangular cross-section, at least on the (plug-in/plug-on) side (plug direction Sr). At its free longitudinal end portion 11, the tab contact body 100 has a plurality of preferably integral plug bases 110, which are arranged one behind the other in the width direction Br and in particular are aligned with one another in the width direction Br. A beginning of the free longitudinal end portion 11 forms one end of an electrical contacting surface of the high-voltage contact means 10.

Here, the plug bases 110 stand away from an end face 12 of the high-voltage tab contact means 10, wherein the end face 12 is designed as an inner end face 12 pointing outwards in the high-voltage tab contact means 10 (inner due to the plug bases 110) on/in the free longitudinal end portion 11. In other words, the outwards-facing (inner) end face 12 delimits the free longitudinal end portion 11 on/in the high-voltage tab contact means 10. The (inner) end face 12 has a substantially rectangular edge or a substantially rectangular shape or contour here, 'radially' outwards.

A single, preferably stud-like or, in particular, pin-like or cuboid plug base 110 stands away from the end face 12, in particular at a right angle, co-constitutes the free longitudinal end portion 11 and has, in particular, a flat, preferably rectangular or elliptical shape at its free end. At a free longitudinal end portion 11, the plug base 110 can taper conically on two sides or in particular on four sides, in particular opposite each other. In the present case, a plug base 110 is offset inwards on four sides from the four longitudinal sides of the high-voltage tab contact means 10 (cf. in particular FIG. 3). It is of course possible to offset the plug base 110 inwards on just one, two or three sides from the four longitudinal sides of the high-voltage tab contact means 10 on the end face 12.

In particular, a clamping slot 120 of the high-voltage tab contact means 10 is provided between each two plug bases 110 and can be designed, for example, as a press-fit slot 120, a latching slot 120, an adhesive slot, etc. An individual plug base 110 preferably has at least one clamping device 112 for this purpose, by means of which the touch protection means 20 can be fixed to the free longitudinal end portion 11 of the high-voltage tab contact means 10.

The clamping device 112 in question can in particular be designed as a pressing device 112, preferably a pressing projection 112, or a latching device 112, preferably a latching projection 112 or a latching recess. The clamping device 112 in question preferably extends in the thickness direction Dr and extends in the width direction Br from its plug base 110 preferably into the directly adjacent clamping slot 120 (e.g. pressing projection, latching projection) or extends in the width direction Br into its plug base 110 (e.g. latching recess).

That is to say, the relevant clamping device 112 is arranged on an inner longitudinal side (further extending in the thickness direction Dr) and preferably not on an outer longitudinal side (further extending in the width direction Br) of the plug base 110. In particular, at least or exactly two clamping devices 112 lying opposite each other in the width direction Br can hold (clamp, press together, latch, etc.) a clamping bar 220 (cf. below) of the touch protection means 20. In the present case, the plug bases 110 do not have a clamping device 112 on their outer longitudinal sides (also extending in the width direction Br).

Other positions and/or forms of the clamping device 112 on/in the plug base 110 may be possible, of course also a clamping device 112 on an outer longitudinal side. An outer plug base 110 in the width direction Br preferably has no clamping device 112 on its outer flank 130 in the width direction Br, i.e. its outer flank 130, but may have a clamping device 112 as appropriate. This applies in particular to the two outer flanks 130 of the outer plug base 110 in the width direction Br. Preferably, the two outer, free end portions of the two outer flanks 130 run conically towards each other.

The touch protection means 20 (cf. also FIGS. 5 and 6), which is mainly rectangular in shape, has plug sockets 210 as negatives to the plug bases 110, as positives, of the high-voltage tab contact means 10, wherein the plug bases 110 can be plugged together (FIG. 1) or are plugged together (FIG. 2) with the plug sockets 210. This means that an individual plug socket 210 is in particular chamber-shaped or in particular hollow-stud-shaped or preferably hollow-pin-shaped or preferably hollow-cuboid-shaped. In this case, the touch protection means 20 has the same or a smaller number of plug sockets 210 than the tab contact body 100 has plug bases 110.

In this case, the plug sockets 210 project from an end face 22 of the touch protection means 20 inwards into the touch protection means 20, wherein the end face 22 is designed as an outer end face 22 pointing inwards in the high-voltage tab terminal 1 at a free end of the touch protection means 20. In other words, the (outer) end face 22 delimits the touch protection means 20 on the inside in the high-voltage tab terminal 1. The (outer) end face 22 has a substantially rectangular edge or a substantially rectangular shape or contour here, 'radially' outwards.

In particular, a clamping bar 220 of the touch protection means 20 is arranged in each case between two directly adjacent plug sockets 210 and can be designed, for example, as a press-fit bar 220, a latching bar 220, an adhesive bar, etc. A clamping bar 220 is elastically and/or plastically deformable as a press-fit bar 220, wherein the dimensions or geometries of the clamping bar 220 and the corresponding clamping slot 112 are matched to one another in accordance with a material of the clamping bar 220.

A respective clamping bar 220 of the touch protection means 20 can be moved forward into a corresponding clamping slot 120 of the high-voltage tab contact means 10, wherein the clamping bar 220 is fixed in the clamping slot 120. In this case, the relevant clamping bar 220 can be received in the clamping slot 120 in a force-fit manner, e.g. pressed in, and/or in a form-fit manner, e.g. latched. Additionally or alternatively, an adhesive connection is of course also applicable.

The respective clamping bar 220 can be fixed here in the clamping slot 120 by two clamping devices 121 of two plug bases 120, which are directed towards each other and are arranged opposite each other in the width direction Br. Here, for example, pressing devices 112 designed as projections 112 can elastically and/or plastically compress or press together the clamping bar 220 and thus hold the clamping bar 220 in the clamping slot 120.

Alternatively, for example, latching devices 112, 212 can hold the clamping bar 220 (latching devices 212) firmly in the clamping slot 120 (latching device 112). In this case, reciprocal latching devices 112/212 are designed as corresponding and/or at least partially complementary latching devices 112/212. Here, the respective latching device 112, 212 can be formed as a latching projection 112 of the respective plug base 120 at the clamping slot 120, and as a respective latching recess 212 in the clamping bar 220. This is of course reversible, i.e. a respective latching projection on the clamping bar 220 and a latching recess in the respective plug base 220, or also interacting latching projections without specifically formed latching recesses.

The touch protection means 20 preferably only has a cover 230 on the outside in the width direction Br, which is neither pressed nor latched to a corresponding plug base 110. In this case, the cover 230 preferably only rests or sits on the respective plug base 110. This applies in particular to both covers 230 in the width direction Br of the touch protection means 20. Preferably, the two outer, free end portions of the two covers 230 taper conically towards each other.

The high-voltage tab terminal 1 is preferably designed in such a way that the four longitudinal sides of the high-voltage tab contact means 10, apart from a possible slot in between, merge substantially flush, i.e. without a step, into the corresponding four longitudinal sides of the touch protection means 20. It is of course possible that only one, two or three longitudinal sides of the high-voltage tab contact means 10 merge flush into the corresponding longitudinal sides of the touch protection means 20. In other words, corresponding longitudinal sides of the high-voltage tab contact means 10 and of the touch protection means 20 are aligned in an end-face view or both lie substantially in a common plane.

The high-voltage tab terminal 1 is also preferably designed in such a way that the main retaining forces F (cf. FIG. 2) between the touch protection means 20 or the clamping bars 220 and the high-voltage tab contact means 10 or the plug bases 110 substantially cancel each other out. The retaining forces F are applied internally (e.g. four narrow inner sides in FIG. 2) to the plug bases 110 instead of to the outer walls (e.g. two large-area outer sides in FIG. 2) of the high-voltage tab contact means 10 or the plug bases 110. The holding forces F, which act on a respective clamping bar 220 from opposite directions, substantially cancel each other out.

Figure 9:
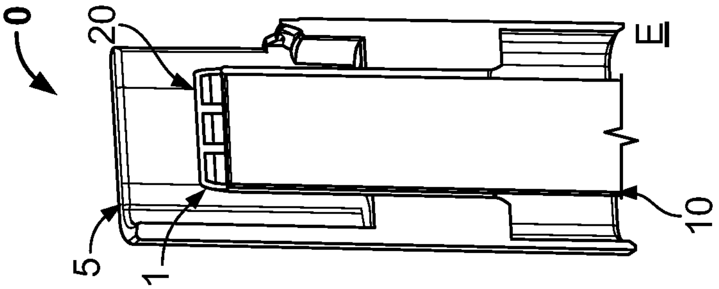
Figure 8:
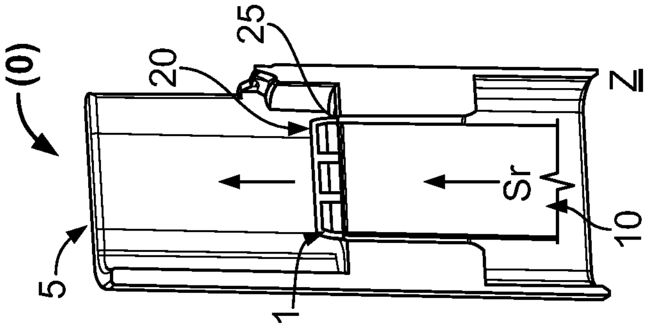
Figure 7:
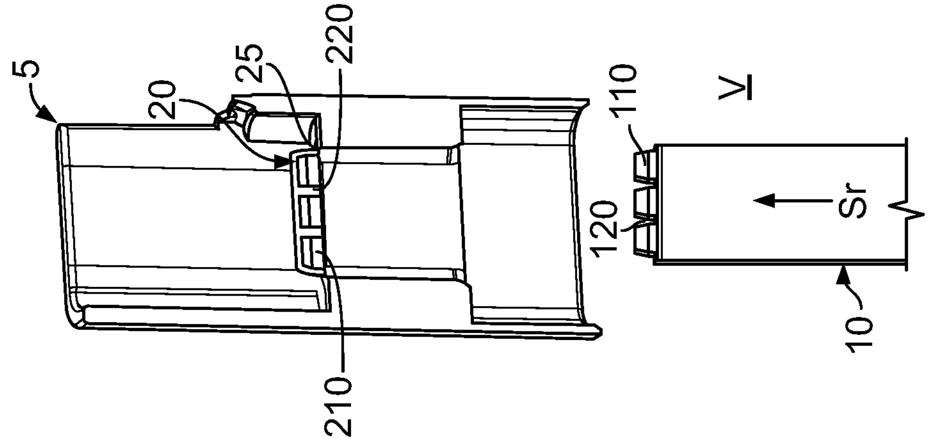

FIGS. 7 to 9 show a method for assembling a high-voltage electrical connector 0. Here, a high-voltage contact means 10 is assembled as a high-voltage terminal 1 in an electrically insulating connector housing 5 of the high-voltage connector 0. This is done using the example of assembling a high-voltage tab contact means 10 as a high-voltage tab terminal 1 taught above in the connector housing 5.

It is of course possible to carry out the assembly method analogously for a high-voltage pin terminal 1 (cf. FIGS. 13 and 14), a high-voltage socket terminal (1) or also a high-voltage special terminal (1) i.e. a high-voltage terminal 1. In this case, the resulting high-voltage connector 0 can comprise only a single high-voltage terminal 1 or also a plurality thereof, wherein the high-voltage terminal 1 can be constructed differently if necessary.

In the assembly process, at least one high-voltage contact means 10 is plugged into the connector housing 5, which connector housing 5 is open at the rear, for example; this is referred to here as the preassembly position V (cf. FIG. 7) of the high-voltage contact means 10 on the connector housing 5. When the high-voltage contact means 10 is moved further forward into the connector housing 5, the high-voltage contact means 10 centers in the connector housing 5; this is referred to here as the intermediate assembly position Z (see FIGS. 7 to 8) of the high-voltage contact means 10 on/in the connector housing 5.

As the high-voltage contact means 10 is moved further forward into the connector housing 5, a touch protection means 20, which is arranged in an interior of the connector housing 5, is plug-assembled at/onto a free longitudinal end portion 11 of the high-voltage contact means 10 by moving the high-voltage contact means 10 forward (FIG. 8). Here, the plug assembly of the touch protection means 20 on the high-voltage contact means 10 can be supported on the plug face side by a tool, e.g. a counter-holder.

In the chronological sequence, the touch protection means 20 can be entrained into the connector housing 5 by a forward movement of the high-voltage contact means 10. The high-voltage terminal 1 created by the high-voltage contact means 10 and the touch protection means 20 is then moved to its final assembly position E (FIG. 9), in which the high-voltage contact means 10 or the high-voltage terminal 1 is fixed, e.g. latched, in the connector housing 5.

The assembly method realizes two method steps of the prior art in a single method step. In the prior art, the touch protection means 20 is assembled at/on the high-voltage contact means 10 in a first step and a high-voltage terminal 1 created as a result is assembled in the connector housing 5 in a subsequent second step. The high-voltage contact means 10 is assembled in the connector housing 5 as a high-voltage terminal 1; i.e. the preferably single assembly movement of the high-voltage contact means 10 into the connector housing 5 creates the high-voltage terminal 1 and fixes it in the connector housing 5.

When the high-voltage contact means 10 is plug-assembled in the connector housing 5, a press-fit connection, a latching connection and/or an adhesively-bonded connection can be established between the touch protection means 20 and the high-voltage contact means 10 as taught above, for example. Temporally subsequently hereto and/or during this process, the touch protection means 20 established in the connector housing 5 can be released from a connection 25 to or in the connector housing 5. The connection 25 of the touch protection means 20 to the connector housing 5 can, for example, be a mechanical and/or adhesive connection 25.

Figure 10:
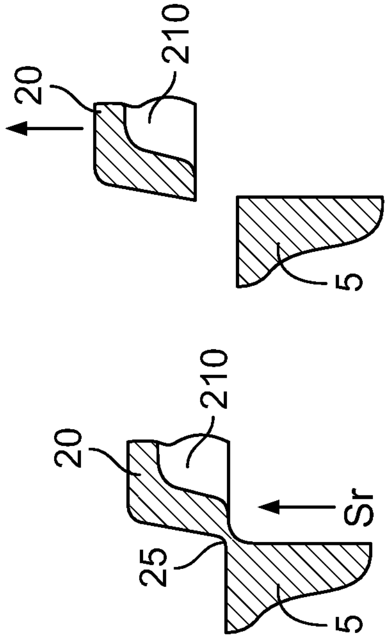

For example, FIG. 10, as connection 25, an integral design of the touch protection means 20 with the connector housing 5, wherein the touch protection means 20 is arranged integrally inside the connector housing 5. The connection 25 is designed here as a predetermined breaking point 25. For example, a type of living hinge (predetermined breaking point) or a thin bar (predetermined breaking point) or a bar with a taper (predetermined breaking point) is suitable for this purpose.

An integral design is understood to mean a design of the touch protection means 20 with the connector housing 5 in which there is only a single original part that can only be separated by 'destroying' it. The original part is made from a single original mass (plastics melt), which in turn is necessarily integral. Such an integral design can be realized, for example, using a single-component injection molding process with separable cast part components.

Figure 11:
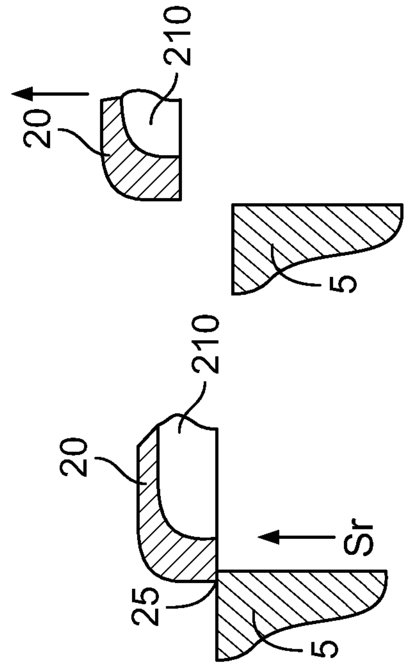
FIGS. 10 to 12 show three embodiments of a connector housing with a touch protection means arranged therein for a high-voltage connector, in each case in fully broken-away, sectional longitudinal side views, when carrying out the assembly method

FIG. 11 shows an adhesive one-piece connection 25 of the touch protection means 20 to the connector housing 5, wherein the touch protection means 20 is adhesively arranged on the inside of the connector housing 5. This means that the touch protection means 20 adheres to the connector housing 5. Furthermore, alternatively or additionally, a form-fit connection 25 and thus a one-piece design of the touch protection means 20 with the connector housing 5 can be realized. The respective connection 25 can be released mechanically.

An adhesive and/or form-fit connection 25 is understood to mean a design of the touch protection means 20 with the connector housing 5 in which these are connected to each other in an integrally bonded manner and/or mechanically, such that the touch protection means 20 can be separated from the connector housing 5 by loosening the connection 25. Such an adhesive and/or form-fit design can be realized, for example, by a multicomponent or two-component injection molding process with separable cast components. The connection 25 itself can be designed here as an adhesive joint and/or an undercut (similar to a latching connection or similar) between the touch protection means 20 and the connector housing 5 as cast components.

FIG. 12 again shows an integral design 25 of the touch protection means 20 with the connector housing 5 as connection 25, wherein the touch protection means 20 is arranged integrally inside the connector housing 5. Here, the connection 25 is designed as an integral bar 25 to be cut away by a cutting tool. For this purpose, the bar must be geometrically designed in such a way that it can be separated by means of the cutting tool in the connector housing 5 or can be removed from the connector housing 5.

Figure 14:
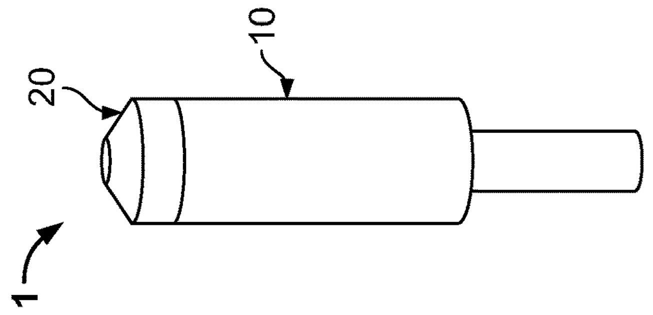
FIGS. 13 and 14 show an application of the one-step assembly method to a round terminal designed as a high-voltage pin terminal, which can also be applied analogously to other high-voltage terminals such as high-voltage socket terminals.
Figure 13:
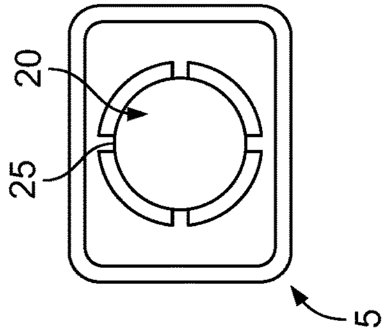
Figure 12:
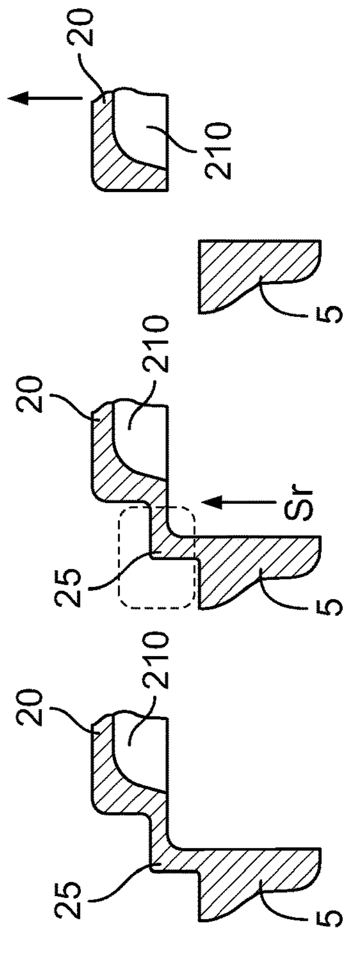
Figure 16:
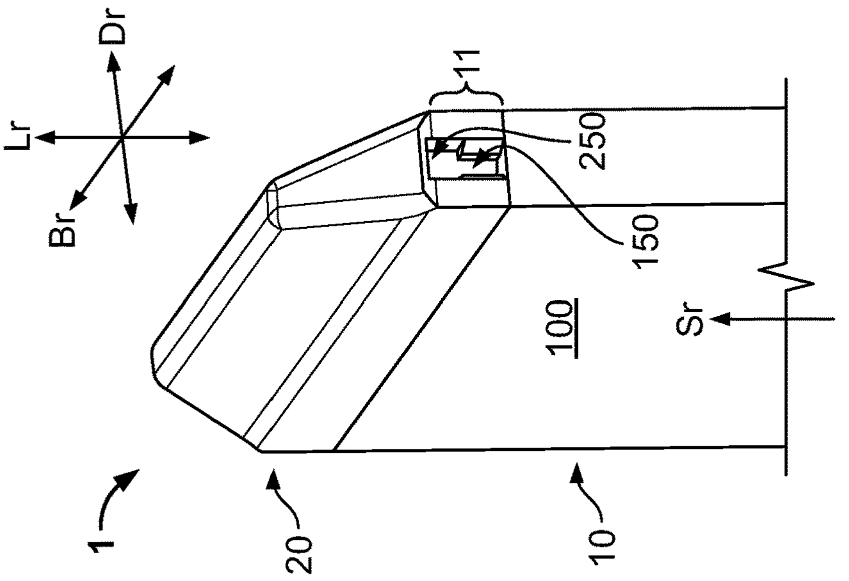
FIGS. 15 and 16 show, in perspective views (FIG. 15, preassembly position.
Figure 15:
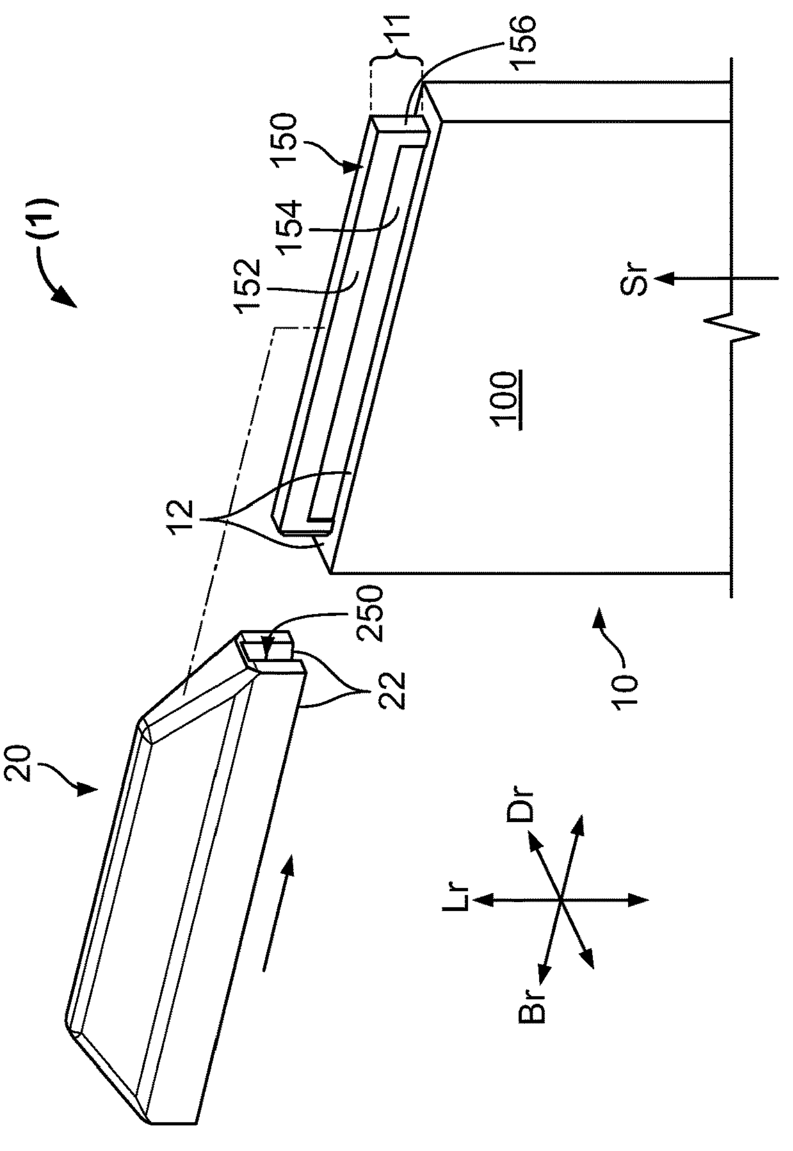
Figure 19:
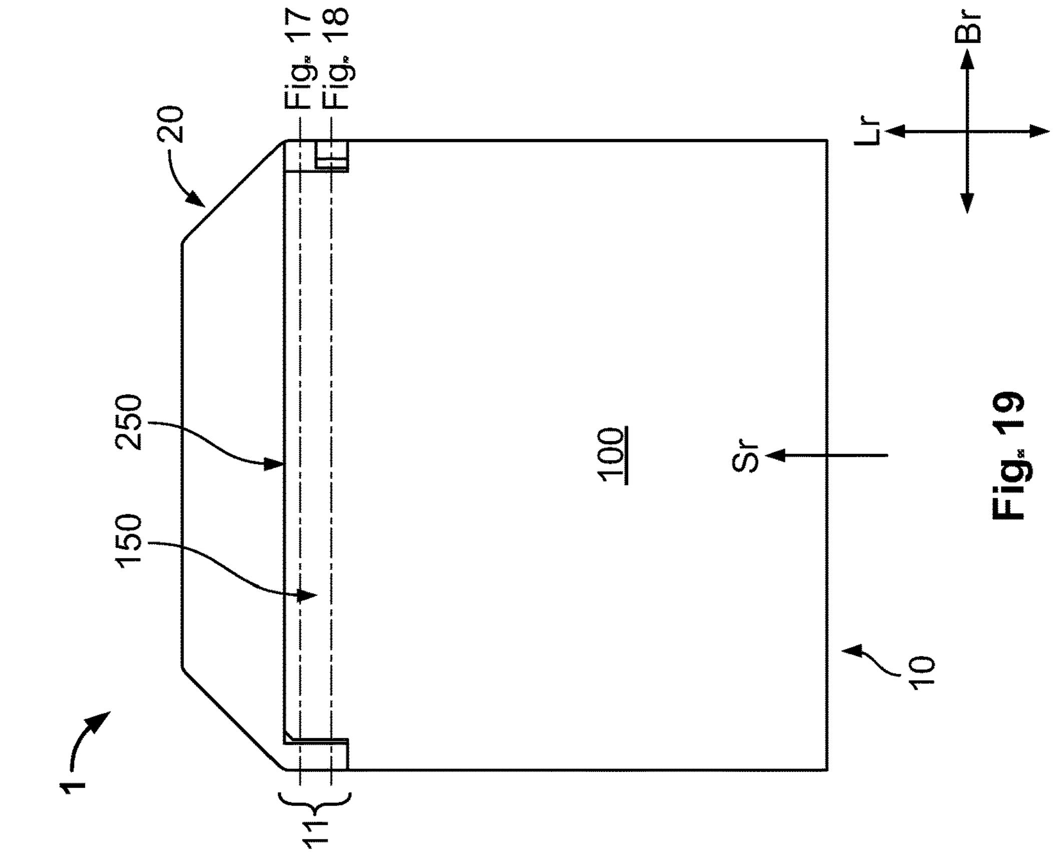
FIGS. 17 to 19 show mutual cut views of the high-voltage tab terminal according to the second variant in its final assembly position (FIG. 16), wherein the mutual fastening of the touch protection means and the high-voltage tab contact means is shown in detail.
Figure 18:
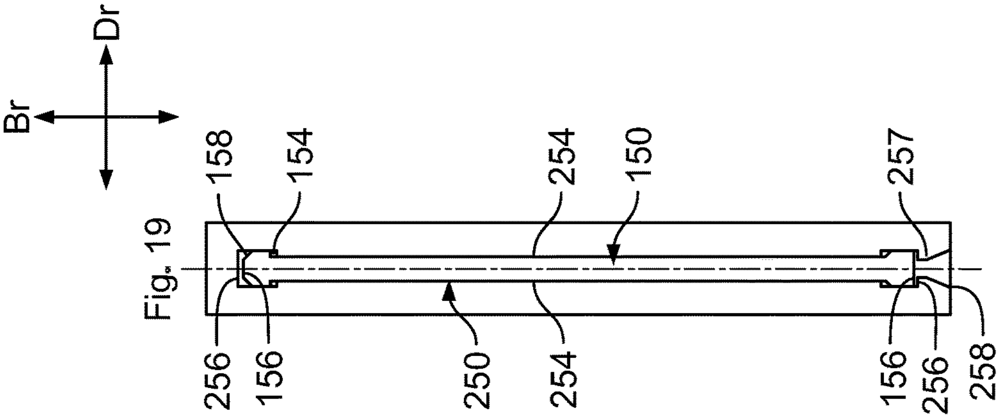
Figure 17:
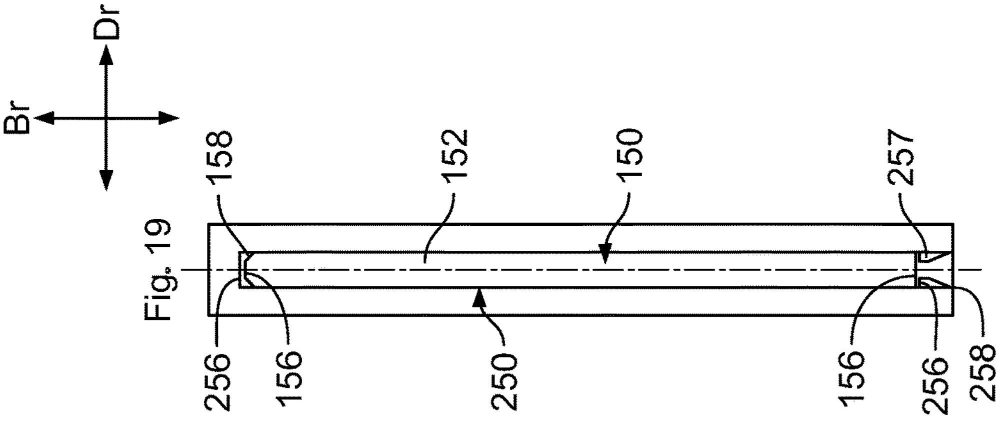
Figure 20:
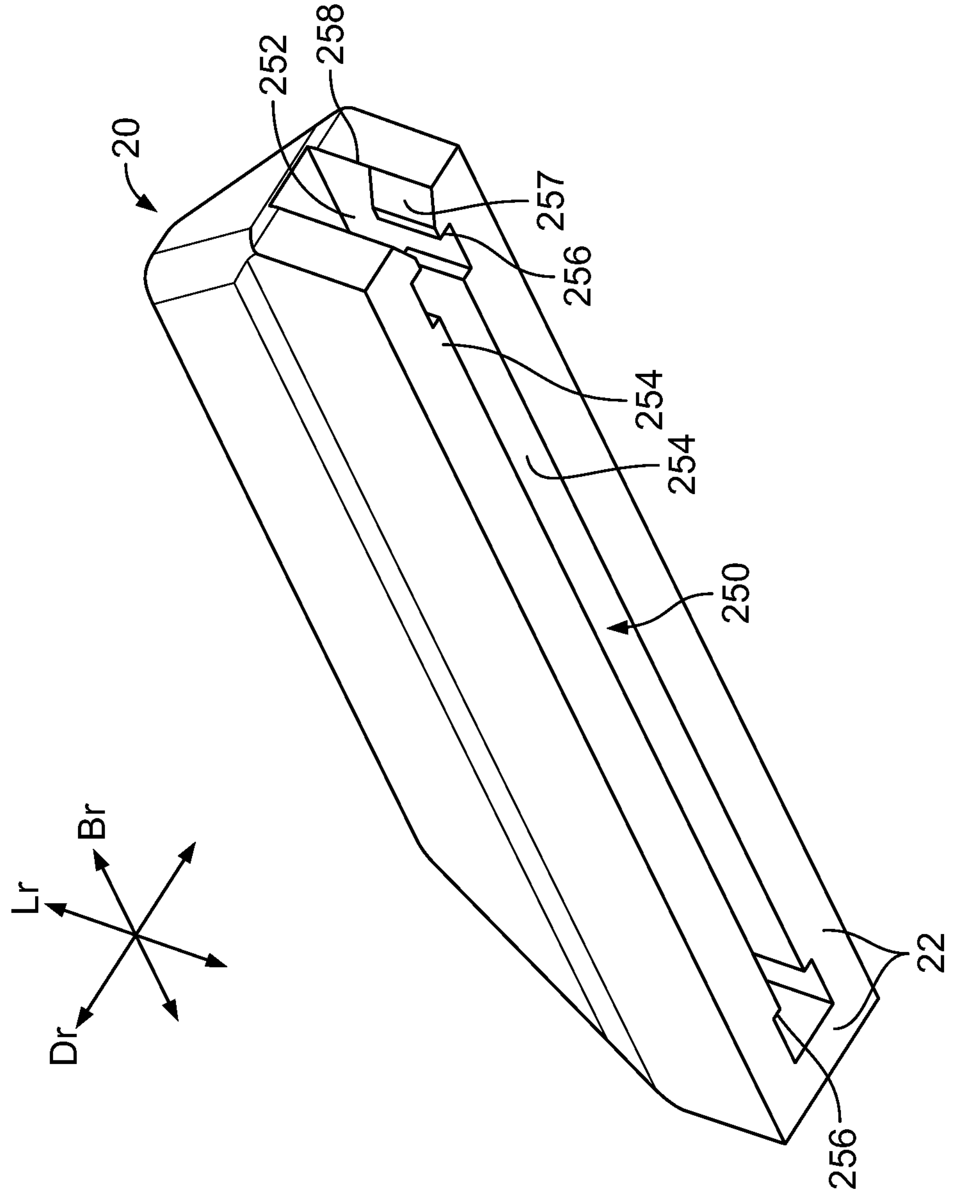
FIG. 20 shows, in a perspective view, the touch protection means of the second variant of the high-voltage tab terminal, which is shaped as a slide and which is pushable laterally in the width direction onto a fastening rail of the high-voltage tab contact means.

FIGS. 13 and 14 show an application of the method to a high-voltage pin terminal 1. FIG. 13, analogously to FIG. 10 or possibly also analogously to FIG. 12, shows an integral connection 25 of a touch protection means 20 for a high-voltage pin contact means 10 on a connector housing 5. The high-voltage pin contact means 10 is inserted here into the connector housing 5 as described above and the touch protection means 20 is then automatically assembled on the high-voltage pin contact means 10, as in the other exemplary embodiments, whereby a high-voltage pin terminal 1 is obtained in a connector housing 5 as a high-voltage connector 0. Of course, a counter-holder can again be used.

FIGS. 15 to 20 show a second variant of a high-voltage tab terminal 1 for a high-voltage connector 0. Here, the attachment of the touch protection means 20 to the high-voltage tab contact means 10 is designed differently to the above described first variant. The features besides the attachment the of the high-voltage tab terminal 1 can be designed as explained above.

According to this variant the stud-like plug base 150 of the high-voltage tab contact means 10 is shaped as a fastening rail 150 in width direction Br, wherein the fastening rail 150 (positive) may be constituted by as a continuous projection (cf. FIGS. 15 to 20). The fastening rail 150 may also be formed by a plurality of lugs, a plurality of tabs etc. (not shown). —Furthermore, the touch protection means 20 is shaped as a slide 20 slipped in width direction Br onto the fastening rail 150. For this purpose, the plug socket 250 of the touch protection means 20 is designed as a slotted plug socket 250 (negative).

The fastening rail 150 constitutes the free longitudinal end portion 11 of the high-voltage tab contact means 10 and projects from the outward-facing end face 12 of the tab contact body 100 as a positive to the slotted plug socket 250. Preferably, the fastening rail 150 is offset inwards from the end face 12 on all sides. However, it is possible for the fastening rail 150 to be flush with an outer side of the contact body 100 on one or more sides, especially a narrow longitudinal side.

Apart from possibly established slots in longitudinal direction Lr (not shown), the entire fastening rail 150 is designed globally as an elongated cuboid whose length is a multiple (e.g. four to 20 times) of its height in longitudinal direction Lr and/or a multiple (e.g. eight to 30 times) of its minimum or maximum width in thickness direction Dr. Instead of a cuboid, a geometric body similar to it can of course also be used.

The fastening rail 150 has an elongated inner recess 154 ((lower) assembly fixture 154) in at least one (not shown), in particular in its two large-area sides, which extend in width direction Br and in longitudinal direction Lr. Due to an inner recess 154 in a large-area side, the fastening rail 150 first has a protrusion 152 ((upper) assembly fixture 152) and then the recess 154 when viewed from the free top side (FIG. 15) in longitudinal direction Lr. As said before, the fastening rail 150 can be designed in this way on both of its large-area sides.

The upper protrusion 152 and the lower recess 154 form an undercut in width direction Br and in thickness direction Dr, wherein the undercut in width direction Br is bounded by at least one, preferably two shoulders 156 ((lateral outer) assembly fixtures 156). The upper protrusion 152, the two lateral outer shoulders 156 and a portion in width direction of the end face 12 constitute a frame for the lower recess 154, wherein the inner edge of the upper frame part (upper protrusion 152) forms the undercut.

Furthermore, it is preferred that one of the shoulders 156 has at least one, in particular two, insertion slopes 158 in order to facilitate sliding of the touch protection means 20 with its slotted plug socket 250 onto the fastening rail 150. The shoulder 156 opposite this shoulder 156 in width direction Br preferably has no insertion slope 158, i.e. it is preferably designed as a flat surface.

The touch protection means 20 comprises the slotted plug socket 250 inside as a negative to the fastening rail 150. This means that the slotted plug socket 250 and the fastening rail 150 are essentially complementary to each other. The entire slotted plug socket 250 of the touch protection means 20 (see in particular FIGS. 17, 18 and 20) is designed globally as an elongated slit whose length is a multiple (e.g. four to 20 times) of its height in longitudinal direction Lr and/or a multiple (e.g. eight to 30 times) of its minimum or maximum width in thickness direction Dr.

From a global perspective, the slotted plug socket 250 is preferably formed as a slot open on two sides in the contact protection means 20. The slotted plug socket 250 opens on the one hand on the underside (a plane spanned by the width direction Br and thickness direction Dr) and on the other hand laterally (a plane spanned by longitudinal direction Lr and thickness direction Dr) at the touch protection means 20.

The slotted plug socket 250 has an elongated inner protrusion 254 ((lower) assembly fixture 254) at at least one (not shown), in particular at its two inner large-area sides, which extend in width direction Br and in longitudinal direction Lr. Due to an inner protrusion 254 at an inner large-area side, the slotted plug socket 250 first has the inner protrusion 254 and then an inner recess 254 ((upper) assembly fixture 252) when viewed from an underside (FIG. 20) outside at the touch protection means 20 in longitudinal direction Lr. As said before, the slotted plug socket 250 can be designed in this way on both of its inner large-area sides.

The upper recess 252 and the lower protrusion 254 form an undercut in width direction Br and in thickness direction Dr, wherein the undercut in width direction Br ends in receiving chambers for the shoulders 156 of the fastening rail 150 of the high-voltage tab contact means 10. And of course, the lower protrusion 254 ends at the receiving chambers, whereby the lower protrusions 254 borders the receiving chambers. The respective receiving chamber is limited by a shoulder 256 ((lateral inner) assembly fixture 256) in width direction Br.

Preferably only one of the shoulders 256 opens to a lateral side of the touch protection means 20 via a lateral opening 258. The touch protection means 20 with its slotted plug socket 250 can be pushed onto the fastening rail 150 through this lateral opening 258, whereby the fastening rail 150 continues to take up space in the slotted plug socket 250. The lateral opening 258 comprises at least one, preferably two insertion slopes 257, in order to facilitate a receiving of the fastening rail 150 in the slotted plug socket 250. —Preferably, the inner surfaces of the shoulders 256 of the slotted plug socket 250 are parallel to the respective outer surfaces of the shoulders 156 of the fastening rail 150.

After an assembly, the touch protection means 20 sits on the high-voltage tab contact means 10 with a possibly tight clearance fit or a possibly wide transition fit, i.e. the touch protection means 20 sits essentially force-free on the high-voltage tab contact means 10. Insertion forces on the touch protection means 20 can be transmitted via the assembly fixtures 152, 154; 252, 254 and/or a free underside of the touch protection means 20 and the end face 12 of the high-voltage tab contact means 10.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical high-voltage tab terminal for a high-voltage connector comprising:
- an electrical high-voltage tab contact means extending in a longitudinal direction; and
- an electrically insulating touch protection means provided on a free longitudinal end portion of the high-voltage tab contact means;
- wherein the high-voltage tab contact means has, in the free longitudinal end portion, at least one stud-like plug base arranged in a width direction of the high-voltage tab contact means, and wherein the touch protection means has at least one plug socket which is at least partially complementary thereto, the at least one stud-like plug base being plugged together with the at least one plug socket,
- wherein the stud-like plug base of the high-voltage tab contact means is shaped as a fastening rail running in the width direction, and
- wherein the touch protection means is shaped as a slide which is slipped in the width direction onto the fastening rail with the plug socket designed as a slotted plug socket.

2. The electrical high-voltage tab terminal according to claim 1, wherein a single stud-like plug base:
- projects away from an end face of the high-voltage tab contact means and the end face delimits the free longitudinal end portion on the inside of the high-voltage tab contact means,
- is offset inwards from the four longitudinal sides of the high-voltage tab contact means on at least one side, at least two sides, at least three sides or four sides, and/or
- tapers conically on at least one side, at least two sides, at least three sides or four sides in the direction of a free end of the stud-like plug base.

3. The electrical high-voltage tab terminal according to claim 1, wherein the high-voltage tab contact means has, in the free longitudinal end portion, a plurality of stud-like plug bases arranged in the width direction of the high-voltage tab contact means, and the touch protection means has a plurality of plug sockets which are at least partially complementary thereto, the plug bases being plugged together with the plug sockets.

4. The electrical high-voltage tab terminal according to claim 3, wherein the plurality of stud-like plug bases are pin-like and/or cuboid-shaped, and:
- at least/exactly two, at least/exactly three, at least/exactly four or at least/exactly five plug bases are arranged in the free longitudinal end portion,
- a clamping slot is arranged between two directly adjacent plug bases to accommodate a clamping bar of the touch protection means,
- outer sides of the plug bases extending in the longitudinal direction and width direction each have no clamping device and/or taper conically towards each other in the direction of free ends, and/or
- outer flanks of outer sides of the plug bases in the width direction of the plug bases each have no clamping device and/or taper towards each other conically in the direction of free ends of the outer plug bases.

5. The electrical high-voltage tab terminal according to claim 3, wherein the plug sockets are arranged as chambers, open on at least one side, in the touch protection means, and:
- the touch protection means has fewer or exactly the same number of plug sockets as the high-voltage tab contact means has plug bases,
- a clamping bar is arranged between two directly adjacent plug sockets for fastening the touch protection means in a clamping slot of the high-voltage tab contact means, and/or
- outer regions of the touch protection means in the width direction are designed as covers of a region of the high-voltage tab contact means located there.

6. The electrical high-voltage tab terminal according to claim 1, wherein, in a transition region of the high-voltage tab terminal from the touch protection means to the high-voltage tab contact means,
- in the high-voltage tab terminal, the touch protection means is aligned on at least one side, at least two sides, at least three sides or four sides substantially flush with longitudinal sides of the high-voltage tab contact means adjoining the touch protection means.

7. The electrical high-voltage tab terminal according to claim 1, wherein the touch protection means is pressed, latched and/or bonded with the high-voltage tab contact means, and/or
- the high-voltage tab terminal is designed such that main retaining forces between the touch protection means and the high-voltage tab contact means only act in the width direction and/or substantially cancel each other out in the width direction.

8. The electrical high-voltage tab terminal according to claim 1, wherein a clamping bar of the touch protection means is fixed in a corresponding clamping slot of the high-voltage tab contact means, wherein:

the clamping bar is received in the clamping slot in a force-fit and/or form-fit manner, the clamping bar is pressed into the clamping slot and/or latched in the clamping slot, and/or the clamping bar is fixed in the clamping slot by two retaining forces acting substantially in the width direction and directed towards each other.

9. The electrical high-voltage tab terminal according to claim 1, wherein the plug base has at least one clamping device designed as a pressing device or a latching device, wherein:

the clamping device is mechanically effective only at/in a clamping slot, the clamping device is designed as a pressing projection or a latching projection or a latching recess, and/or the clamping device is arranged on an inner longitudinal side and not on an outer longitudinal side of the plug base.

10. The electrical high-voltage tab terminal according to claim 1, wherein outer edge areas, which are opposite each other and completely encircle the longitudinal direction, of an outward-facing inner end face of the high-voltage tab contact means and of an inward-facing outer end face of the touch protection means, are arranged in the high-voltage tab terminal mainly or substantially congruent, substantially parallel, substantially form-fittingly against each other and/or directly adjacently to each other via a narrow slot.

11. The electrical high-voltage tab terminal according to claim 1, wherein:

the high-voltage tab terminal is designed as a straight or angled high-voltage tab terminal, and/or the high-voltage tab terminal is designed as a merely two-piece, fixedly closed component.

12. The electrical high-voltage tab terminal according to claim 1, wherein the slotted plug socket and the fastening rail are formed in such a way that:

in the width direction, the touch protection means can be attached laterally to the fastening rail and be pushed laterally over the fastening rail, whereby the fastening rail is received in the slotted plug socket, when the touch protection means is initially pushed over the fastening rail, the slotted plug socket, which is open on at least one lateral side, can be pressed more open and thus the fastening rail can be received in the slotted plug socket, and/or after an assembly of the touch protection means at the fastening rail, the fastening rail is only form-fittingly received in the touch protection means.

13. The electrical high-voltage tab terminal according to claim 1, wherein by means of assembly fixtures of the slotted plug socket and the fastening rail, the touch protection means is held force-free by a positive fit on the high-voltage tab contact means, for which purpose assembly fixtures are seated against one another.

14. The electrical high-voltage tab terminal according to claim 1, wherein assembly fixtures of the fastening rail comprise an upper assembly fixture extending in the width direction and a lower assembly fixture extending in the width direction:

the upper assembly fixture and the lower assembly fixture are arranged one behind the other in the longitudinal direction forming an undercut outside at the fastening rail, two such undercuts are provided in the fastening rail in a thickness direction (Dr), wherein inner sides of the slotted plug socket abut with positive fits against the undercuts, and/or the upper assembly fixture is constituted as a protrusion and the lower assembly fixture is constituted as a recess in the fastening rail.

15. The electrical high-voltage tab terminal according to claim 1, wherein:

in the width direction, a lateral assembly fixture of the high-voltage tab contact means is constituted as a lateral outer shoulder of the fastening rail, inwardly stepped at an end face of the high-voltage tab contact means, in the width direction, a lateral assembly fixture of the touch protection means is constituted as a lateral inner shoulder of the slotted plug socket, wherein the lateral inner shoulder delimits the actual plug socket, and/or after an assembly of the touch protection means at the fastening rail, the two lateral outer shoulders of the fastening rail abut against the two lateral inner shoulders of the slotted plug socket.

16. The electrical high-voltage tab terminal according to claim 1, wherein:

in order to receive the fastening rail, the slotted plug socket is open on one lateral side, a lateral opening of the slotted plug socket for receiving the fastening rail in the slotted plug socket comprises an insertion slope, and/or the lateral opening comprises two tapered wedges which guide the fastening rail into the actual slotted plug socket during assembly of the touch protection means at the high-voltage tab contact means.

17. A method for assembling a high-voltage electrical connector comprising:

inserting at least one high-voltage contact means, coming from one side, into an electrically insulating connector housing, which is open there; and centering the high voltage contact means in the connector housing; wherein when the high-voltage contact means is moved forward into a final assembly position in the connector housing, a touch protection means arranged in the connector housing is plug-assembled on a free longitudinal end portion of the high-voltage contact means, wherein a stud-like plug base of the high-voltage contact means is shaped as a fastening rail running in the width direction, and wherein the touch protection means is shaped as a slide which is slipped in the width direction onto the fastening rail with a plug socket designed as a slotted plug socket.

18. The assembly method according to claim 17, wherein when the high-voltage contact means is moved forward:

the touch protection means is push-on mounted and/or plugin mounted at the high-voltage contact means, the plug assembly of the touch protection means at the high-voltage contact means is supported by a tool for counter-holding, and/or the high-voltage contact means is fixed in the connector housing for the final assembly position.

19. The assembly method according to claim 17, wherein, during the plug assembly:

a press-fit connection, a latching connection and/or an adhesively-bonded connection is established between the touch protection means and the high-voltage contact means, the touch protection means arranged in the connector housing is released from a connection to the connector housing, and/or the touch protection means is entrained into the connector housing by a forward movement of the high-voltage contact means.

20. The assembly method according to claim 17, wherein the connection is designed as at least one integral or non-integral connection, an integral bar to be cut away, or an adhesive and/or form-fit connection between the touch protection means and the connector housing.

21. The assembly method according to claim 17, wherein:

the touch protection means is released from the connector housing by moving the high-voltage contact means forward in the direction of the final assembly position, and/or the touch protection means is detached from the connector housing by means of a tool, in particular a cutting tool.

22. The assembly method according to claim 17, wherein a high-voltage terminal is designed as a high-voltage tab terminal including the electrical high-voltage tab contact means extending in a longitudinal direction and the electrically insulating touch protection means provided on the free longitudinal end portion of the high-voltage tab contact means, wherein the high-voltage tab contact means has, in the free longitudinal end portion, at least one stud-like plug base arranged in a width direction of the high-voltage tab contact means, and wherein the touch protection means has at least one plug socket which is at least partially complementary thereto, the at least one plug base being plugged together with the at least one plug socket.

23. An electrical high-voltage connector for an electrical high-voltage connection comprising:

an electrically insulating connector housing; and at least one electrical high-voltage terminal accommodated therein, wherein the high-voltage terminal includes an electrical high-voltage tab contact means extending in a longitudinal direction and an electrically insulating touch protection means provided on a free longitudinal end portion of the high-voltage tab contact means, wherein the high-voltage tab contact means has, in the free longitudinal end portion, at least one stud-like plug base arranged in a width direction of the high-voltage tab contact means, and wherein the touch protection means has at least one plug socket which is at least partially complementary thereto, the at least one plug base being plugged together with the at least one plug socket, wherein the at least one stud-like plug base of the electrical high-voltage tab contact means is shaped as a fastening rail running in the width direction, and wherein the touch protection means is shaped as a slide which is slipped in the width direction onto the fastening rail with the at least one plug socket designed as a slotted plug socket.

24. The electrical high-voltage connector of claim 23, wherein the high-voltage terminal is inserted into the electrically insulating connector housing, coming from one side, and the high voltage terminal is centered in the connector housing; wherein when the high-voltage contact means is moved forward into a final assembly position in the connector housing, the touch protection means arranged in the connector housing is plug-assembled on the free longitudinal end portion of the high-voltage contact means.

* * * * *